United States Patent
Oku

(10) Patent No.: US 9,686,318 B2
(45) Date of Patent: Jun. 20, 2017

(54) SYSTEM AND METHOD FOR PROVIDING USER WITH SERVICES

(71) Applicant: DeNA Co., Ltd., Tokyo (JP)

(72) Inventor: Kazuho Oku, Tokyo (JP)

(73) Assignee: DeNA Co., Ltd., Tokyo (JP)

(*) Notice: Subject to any disclaimer, the term of this patent is extended or adjusted under 35 U.S.C. 154(b) by 0 days.

(21) Appl. No.: 14/869,309

(22) Filed: Sep. 29, 2015

(65) Prior Publication Data

US 2016/0105460 A1  Apr. 14, 2016

(30) Foreign Application Priority Data

Oct. 9, 2014  (JP) ................................. 2014-207937

(51) Int. Cl.

| | |
|---|---|
| G06F 7/04 | (2006.01) |
| H04L 29/06 | (2006.01) |
| H04L 29/08 | (2006.01) |
| A63F 13/00 | (2014.01) |
| A63F 13/73 | (2014.01) |
| A63F 13/335 | (2014.01) |
| A63F 13/75 | (2014.01) |

(52) U.S. Cl.
CPC .............. H04L 63/20 (2013.01); A63F 13/00 (2013.01); A63F 13/335 (2014.09); A63F 13/73 (2014.09); A63F 13/75 (2014.09); H04L 29/0854 (2013.01); H04L 63/08 (2013.01); H04L 67/02 (2013.01); H04L 67/306 (2013.01); H04L 67/42 (2013.01)

(58) Field of Classification Search
CPC ..... H04L 67/42; H04L 29/0854; G06F 21/62; G06F 21/6227

USPC ......................................... 726/2, 27; 709/248
See application file for complete search history.

(56) References Cited

U.S. PATENT DOCUMENTS

| | | | | |
|---|---|---|---|---|
| 5,907,675 A | * | 5/1999 | Aahlad ................... | G06F 9/465 709/203 |
| 2008/0250412 A1 | * | 10/2008 | Clark ....................... | G06F 9/52 718/102 |
| 2008/0270629 A1 | * | 10/2008 | Yang ....................... | H04M 3/42 709/248 |

(Continued)

FOREIGN PATENT DOCUMENTS

JP  2014-061422 A  4/2014

*Primary Examiner* — Venkat Perungavoor
*Assistant Examiner* — Peiliang Pan
(74) *Attorney, Agent, or Firm* — Pillsbury Winthrop Shaw Pittman LLP

(57) ABSTRACT

Improper communication using modified software is inhibited without checking game data itself. A system according to one embodiment realizes provision of an online game to a login user with HTTP communication between the server and the client terminal. The HTTP communication includes transmitting, by a terminal device, a HTTP request to which a sequence number of the terminal side is attached; checking, by the server, validity of the HTTP request based on comparison between the sequence number of the login user stored in the server and the sequence number attached to the HTTP request; updating, by the server, the sequence number according to a predetermined update rule; transmitting, by the server, a HTTP response; and updating, by the terminal device, the sequence number in the terminal device according to the predetermined update rule.

8 Claims, 6 Drawing Sheets

(56) References Cited

U.S. PATENT DOCUMENTS

| | | | |
|---|---|---|---|
| 2010/0036517 A1* | 2/2010 | Takizawa | G06F 11/0736 700/110 |
| 2012/0060062 A1* | 3/2012 | Lin | H04L 67/1002 714/48 |
| 2013/0111007 A1* | 5/2013 | Hoffmann | G06F 11/3409 709/224 |

* cited by examiner

SYSTEM AND METHOD FOR PROVIDING USER WITH SERVICES

CROSS-REFERENCE TO RELATED APPLICATIONS

This application is based on and claims the benefit of priority from Japanese Patent Application Serial No. 2014-207937 (filed on Oct. 9, 2014), the contents of which are hereby incorporated by reference in their entirety.

TECHNICAL FIELD

The present disclosure relates to a system and method for providing a predetermined service to a user, more particularly, a system that includes a server and a client terminal communicatively connected to the server and provides a predetermined service to a user through a predetermined program executed on the client terminal.

BACKGROUND

There has been a problem of cheat using a modified client software (hereinafter may be referred to as a "cheating client") on a system that provides Internet services such as online games. For example, in a system providing an online game, there has been an issue that an user who tries to cheat on the game creates a cheating client in which data is modified such that items, characters and the like used in the game becomes more advantageous for the user. The user uses this cheating client to progress the game improperly. Such cheating users typically modify data relating to items, characters and the like used in the game through the cheating client using legitimate user IDs of the cheating users, and then play the game through a normal client software using the same user IDs. In order to prevent such cheating acts, there has been proposed a game program to detect improper data such as data including numerical values out of a regular range, data including a prohibited character string and the like by checking the game data used in the online game (see for example, Japanese Patent Application Publication No. 2014-061422).

However, according to the above mentioned method to detect improper data, it may be necessary to check the game data actually used in the online game frequently, which may increase load on execution of the game program and lead to the performance deterioration of the online game. Therefore, it is preferable that improper communication using modified software be inhibited without checking the game data itself.

SUMMARY

One object of an embodiment of the present disclosure is to inhibit improper communication using modified software and the like without checking game data itself. Other objects of the present disclosure will be apparent with reference to the entire description in this specification.

According to one embodiment of the present disclosure, a system for providing a predetermined service to a user through a predetermined program executed on a client terminal includes: a server; and a client terminal communicatively coupled to the server. The system realizes provision of the predetermined service to a login user who is logged in to the server through the predetermined program with predetermined communication between the server and the client terminal. The client terminal includes a terminal-side storage storing confirmation information in a dedicated region of the predetermined program. The server includes a server-side storage storing the confirmation information of each user. The predetermined communication includes: transmitting to the server, by the client terminal, a request to which the confirmation information stored in the terminal-side storage is attached; checking, by the server, validity of the request based on comparison between the confirmation information attached to the request from the client terminal and the confirmation information of the login user stored in the server-side storage; updating, by the server, the confirmation information of the login user according to a predetermined update rule; transmitting, by the server, a response to the request to the client terminal; and updating, by the client terminal, in response to the response from the server to the request, the confirmation information stored in the terminal-side storage according to the predetermined update rule.

According to one embodiment of the disclosure, a method of providing a predetermined service to a user through a predetermined program executed on a client terminal communicatively coupled to a server. The method realizes provision of the predetermined service to a login user who is logged in to the server through the predetermined program with a predetermined communication between the server and the client terminal. The client terminal includes a terminal-side storage storing confirmation information in a dedicated region of the predetermined program. The server includes a server-side storage storing the confirmation information of each user. The predetermined communication includes: transmitting to the server, by the client terminal, a request to which the confirmation information stored in the terminal-side storage is attached; checking validity of the request based on comparison between the confirmation information attached to the request from the client terminal and the confirmation information of the login user stored in the server-side storage; updating, by the server, the confirmation information of the login user according to a predetermined update rule; transmitting, by the server, a response to the request to the client terminal; and updating, by the client terminal, in response to the response from the server to the request, the confirmation information stored in the terminal-side storage according to the predetermined update rule.

According to various embodiments of the disclosure, it is possible to inhibit improper communication using modified software without checking the game data itself.

DESCRIPTION OF THE PREFERRED EMBODIMENTS

Figure 1:
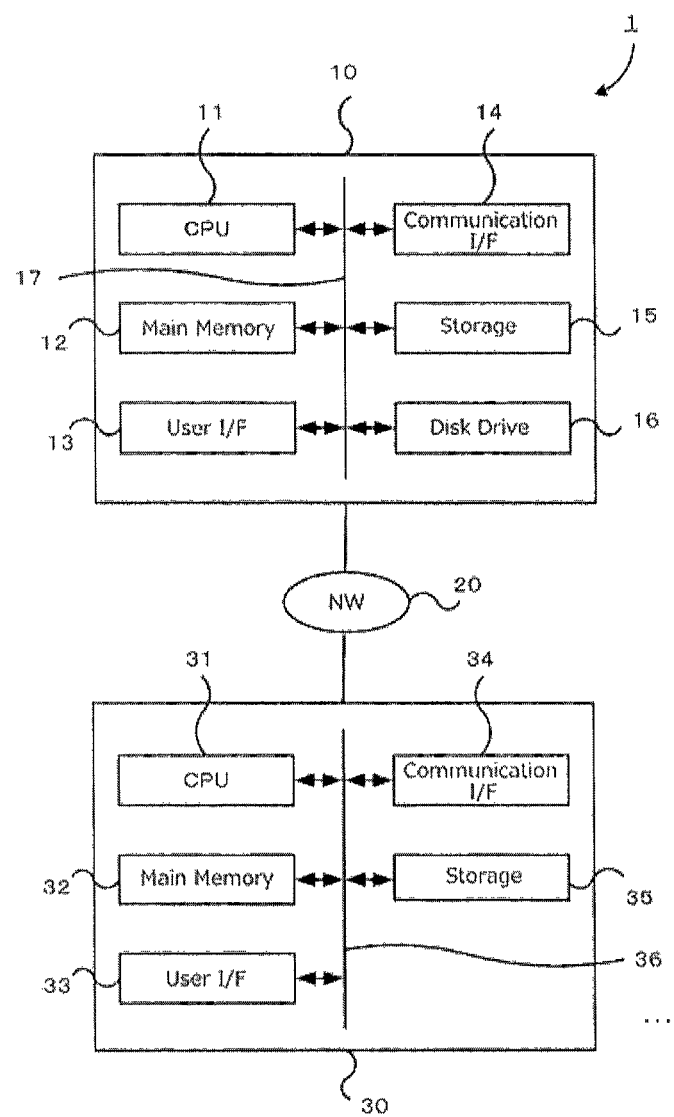
FIG. 1 is a block diagram schematically illustrating a system 1 according to an embodiment of the disclosure.

FIG. 1 is a block diagram schematically illustrating a system 1 according to an embodiment of the disclosure. Referring to FIG. 1, the system 1 according to the embodiment may include a server 10 and a plurality of terminal devices 30 (client terminals) communicatively coupled to the server 10 through a communication network such as Internet. The system 1 according to the embodiment may provide, to a user of the terminal device 30, various digital contents service including online games, electronic books, video contents, and music contents; a communication platform service (SNS platform) for implementing various user-to-user communication features such as text chat (mini mail), circle, avatar, diary, message board, and greeting, etc.; and various Internet services including electronic commerce services, etc.

As illustrated in FIG. 1, the server 10 may be configured as a common computer device and may include a central processing unit (CPU) (computer processor) 11, a main memory 12, a user interface (I/F) 13, a communication I/F 14, storage 15, and a disk drive 16, and these components may be electrically interconnected via a bus 17. The CPU 11 may load an operating system and various programs into the main memory 12 from the storage 15, and may execute commands included in the loaded programs. The main memory 12 may be used to store a program to be executed by the CPU 11, and may be formed of, for example, a dynamic random access memory (DRAM) or the like. The server 10 according to an embodiment may be configured from computer devices that have the above-described hardware configurations.

The user I/F 13 may include, for example, an information input device such as a keyboard and a mouse for accepting an input from an operator, and an information output device such as a liquid crystal display for outputting calculation results of the CPU 11. The communication I/F 14 may be implemented as hardware, firmware, or communication software such as a transmission control protocol/Internet protocol (TCP/IP) driver or a point-to-point protocol (PPP) driver, or a combination thereof, and may be configured to be able to communicate with the terminals 30 via the communication network 20.

The storage 15 may be formed of, for example, a magnetic disk drive and store various programs such as a control program for controlling the provision of various services. The storage 15 may also store various data used in the provision of various services. The various data that may be stored in the storage 15 may also be stored on a database server communicatively connected to the server 10 and physically separate from the server 10. The disk drive 16 may read data stored in storage medium such as a compact disc read only memory (CD-ROM), digital versatile disc read only memory (DVD-ROM), or DVD Recordable (DVD-R) disc, or write data to such a storage medium.

In an embodiment, the server 10 may function as a web server for managing a web site including a plurality of hierarchical web pages and may provide the terminal device 30 with various above-mentioned Internet services through the web site. The storage 15 may also store the HTML data corresponding to the web page. Additionally, the HTML data may include programs written in script languages such as JavaScript™.

In an embodiment, the server 10 may provide various Internet services to the terminal device 30 through applications executed on execution environments other than a web browser on the terminal device 30. The storage 15 may also store such applications. The game application programs may be created in, for example, programming languages such as Objective-C™ and Java™. The application stored on the storage 15 may be delivered to the terminal device 30 in response to a delivery request. The terminal device 30 may download such applications from a server (a server providing application markets) other than the server 10.

Thus, the server 10 may manage the web site for providing various services and deliver web pages (HTML data) constituting the web site in response to a request from the terminal device 30, thereby providing various services to a user of the terminal device 30. Also, the server 10 can provide various services based on communication with an application performed on the terminal device 30 in place of, or in addition to, such web-page (web browser)-based services. The server 10 can transmit and receive various data (including data necessary to display a screen) to/from the terminal device 30 in order to provide services in any manner. The server 10 can store various types of data that are required to provide services. The server 10 may store such data for each piece of identification information (for example, user ID) that identifies each user and thereby can manage statuses (for example, (e.g., progress state of the game) of services provided to each user. Briefly, the server 10 may also include a function to authenticate (login) a user at start of various services and perform charging process in accordance with provision of various services.

The terminal device 30 according to an embodiment may be any information processing device that may display on a web browser a web page of a web site provided by the server 10 and include an executing environment for executing applications. As an example of such information processing device may include personal computers, smartphones, mobile phones, tablet terminals, wearable devices, and game-dedicated terminals.

As illustrated in FIG. 1, the terminal device 30 may be configured as a typical computer device that includes a central processing unit (CPU) (computer processor) 31, a main memory 32, a user interface (I/F) 33, a communication I/F 34, and storage 35, and these components may be electrically interconnected via a bus 36.

The CPU 31 may load an operating system and various programs into the main memory 32 from the storage 35, and may execute commands included in the loaded programs. The main memory 32 may be used to store a program to be executed by the CPU 31, and may be formed of, for example, a dynamic random access memory (DRAM) or the like.

The user I/F 33 may include, for example, an information input device such as a touch panel, a keyboard, a button, and a mouse for accepting an input from a user, and an information output device such as a liquid crystal display for outputting calculation results of the CPU 31. The communication I/F 34 may be implemented as hardware, firmware, or communication software such as a transmission control protocol/Internet protocol (TCP/IP) driver or a point-to-point protocol (PPP) driver, or a combination thereof, and may be configured to be able to communicate with the server 10 via the communication network 20.

The storage 35 may comprise, for example, a magnetic disk drive or a flash memory and store various programs such as an operating system. The storage 35 may also store various applications received from the serve 10 and the like.

The terminal device 30 may include, for example, a web browser for interpreting an HTML file (HTML data) and rendering a screen; this web browser may enable the terminal device 30 to interpret the HTML data fetched from the server 10 and render web pages corresponding to the received HTML data. A plug-in software that can execute files of various formats associated with the HTML data may be embedded in the web browser of the terminal device 30.

When a user of the terminal device 30 receives various services provided by the server 10, for example, animation or an operation icon designated by HTML data or applications may be displayed on a screen of the terminal device 30. A user can input various instructions via a touch panel or the like of the terminal device 30. The instruction entered by the user may be transmitted to the server 10 through the web browser or a function of an execution environment such as NgCore™ on the terminal device 30.

Figure 2:
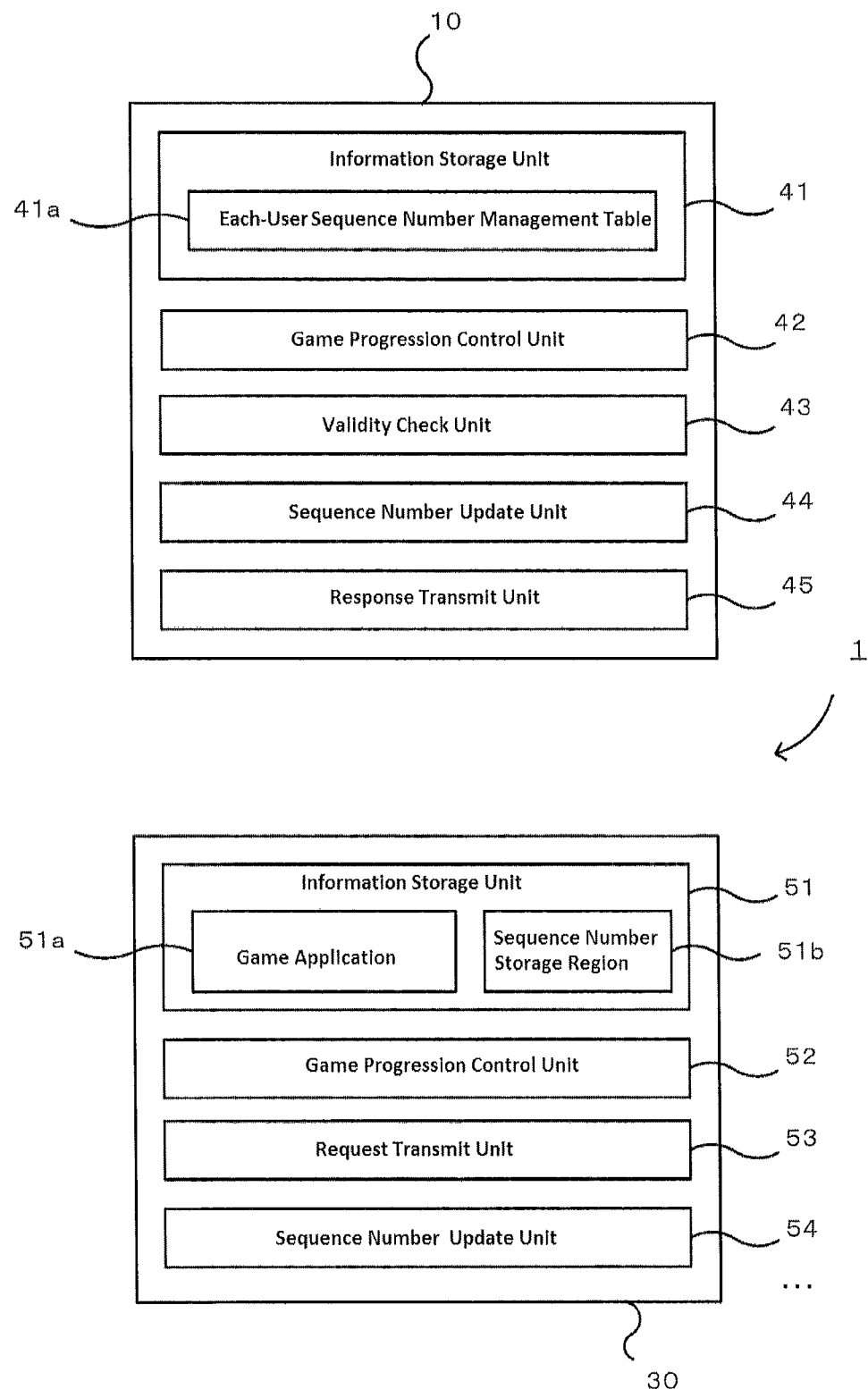
FIG. 2 is a block diagram illustrating the functionality of the system 1 according to an embodiment.

Next, features of the system 1 according to an embodiment will be described. FIG. 2 is a block diagram illustrating the features of the system 1 according to an embodiment. The system 1 according to the embodiment may provide the above-described various Internet services to a user. However, here focusing on features related to provision of a certain online game and such features will be hereunder described. Referring to FIG. 2, the server 10 provided in the system 1 according to an embodiment may include an information storage unit 41 configured to store various types of information, a game progression control unit 42 configured to control progression of a specific online game, a validity check unit 43, a sequence number update unit 44, and a response transmit unit 45. The validity check unit 43 may check validity of an HTTP request based on comparison between a sequence number attached to the HTTP request from the terminal device 30 and a sequence number of a login user stored in the information storage unit 41. The sequence number update unit 44 may update the sequence number of the login user according to a prescribed update rule. The response transmit unit 45 may transmit a HTTP response responding to the HTTP request to the terminal device 30. These functionalities may be implemented by cooperation between the CPU 11 and various programs and tables stored on the main memory 12 and the storage 15. An example of such cooperation may be execution of instructions included in a loaded program by the CPU 11.

Figure 3:
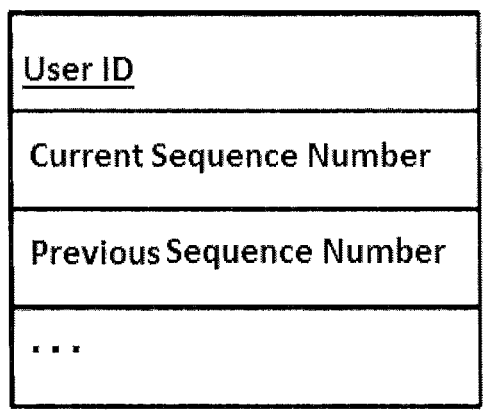
FIG. 3 is a diagram showing an example of information managed by an each-user sequence number management table according to an embodiment.

The information storage unit 41 of the server 10 according to the embodiment may include the storage 15 and the like and may have an each-user sequence number management table 41*a* for managing a sequence number of each user. FIG. 3 is a diagram showing an example of information managed by the each-user sequence number management table 41*a* according to an embodiment. Referring to FIG. 3, the each-user sequence number management table 41*a* manages, in association with a "user ID" identifying each user, a "current sequence number" (first confirmation information) corresponding to the user and a "previous sequence number" (second confirmation information) corresponding to the user, and the like. Here, the "previous sequence number" is a sequence number before updated to the "current sequence number." In other words, the server 10 according to one embodiment may manage the sequence number of each user for two generations. A prescribed value may be set to the sequence number as an initial value and then updated in accordance with communication between the server 10 and the terminal device 30 when a specific online game is provided to a user. Updating operation of the sequence number will be described later.

Referring to FIG. 2, the terminal device 30 according to an embodiment may include an information storage unit 51 configured to store various types of information, a game progression control unit 52 configured to control progression of a specific online game, a request transmit unit 53, and a sequence number update unit 54. The request transmit unit 53 may transmit, to the server 10, an HTTP request accompanied with the sequence number stored in the information storage unit 51. The sequence number update unit 54 may, in respond to the HTTP response from the serve 10 responding to the HTTP request, update the sequence number stored in the information storage unit 51 according to a predetermined update rule. These functionalities may be implemented by cooperation between the CPU 31 and various programs and tables stored on the main memory 32 and the storage 35. An example of such cooperation may be execution of instructions included in a loaded program by the CPU 31.

The information storage unit 51 of the terminal device 30 according to an embodiment may be configured from the storage 35 and the like, and a game application (a predetermined program) 51*a* may be stored (installed) thereon. The game application 51*a* is an application for a user of the terminal device 30 to play a specific online game and may be downloaded from the server 10 or an application market or the like depending on instructions from the user. The game application 51*a* causes the terminal device 30 to implement the above-described features (more specifically, features corresponding to the game progression control unit 52, the request transmit unit 53, and the sequence number update unit 54) in response to the execution of the game application 51*a* on the terminal device 30.

The information storage unit 51 according to an embodiment may have a sequence number storage region 51*b* to store the sequence number. According to the embodiment, the sequence number storage region 51*b* may be a region dedicated to the above-described game application 51*a*. More specifically, the sequence number storage region 51*b* is managed by the game application 51*a* and access to the region by any programs other than the game application 51*a* is inhibited. For example, only the accesses via the game application 51*a* to the information stored in the sequence number storage region 51*b* are allowed but accesses through other applications are not allowed. In one embodiment, the sequence number storage region 51*b* may be configured as a non-volatile region implemented by EEPROM, flash memory or the like and the information stored therein is maintained even after restart of the terminal device 30.

In one embodiment, the sequence number stored in the sequence number storage region 51*b* may be set, for example, at the time of installation of the game application 51*a*, at the time of user registration in a specific online game played through the game application 51*a* or the like, and a prescribed value is set as an initial value. Thereafter the sequence number is updated in accordance with communication performed between the server 10 and the terminal device 30 when the online game is provided to the user. Updating operation of the sequence number will be described later. The initial value of the sequence number stored in the sequence number storage region 51*b* is identical to an initial value of the sequence number managed in the each-user sequence number management table 41*a* of the server 10.

Next, operations of the system 1 according to an embodiment will now be described. As described above, the system 1 according to one embodiment may provide an online game to a user who is logged in to the server 10 through the game application 51*a* run on the terminal device 30. Provision of the online game may be realized by communication (prescribed communication) between the server 10 and the terminal device 30. More specifically, according to one embodiment, the game progression control unit 42 of the server 10 and the game progression control unit 52 of the terminal device 30 may cooperate to transmit and receive various data necessary for progression of the online game between the server 10 and the terminal device 30. For example, by the feature of the game progression control unit 42 of the server 10, screen data (for example, HTML data or other control data or the like) in accordance with a progress state of the online game may be sent to the terminal device 30 and, by the feature of the game progression control unit 52 of the terminal device 30, a screen may be displayed based on the received screen data. In one embodiment, the reception and transmission of such data may be realized through HTTP communication in accordance with HTTP.

Figure 4:
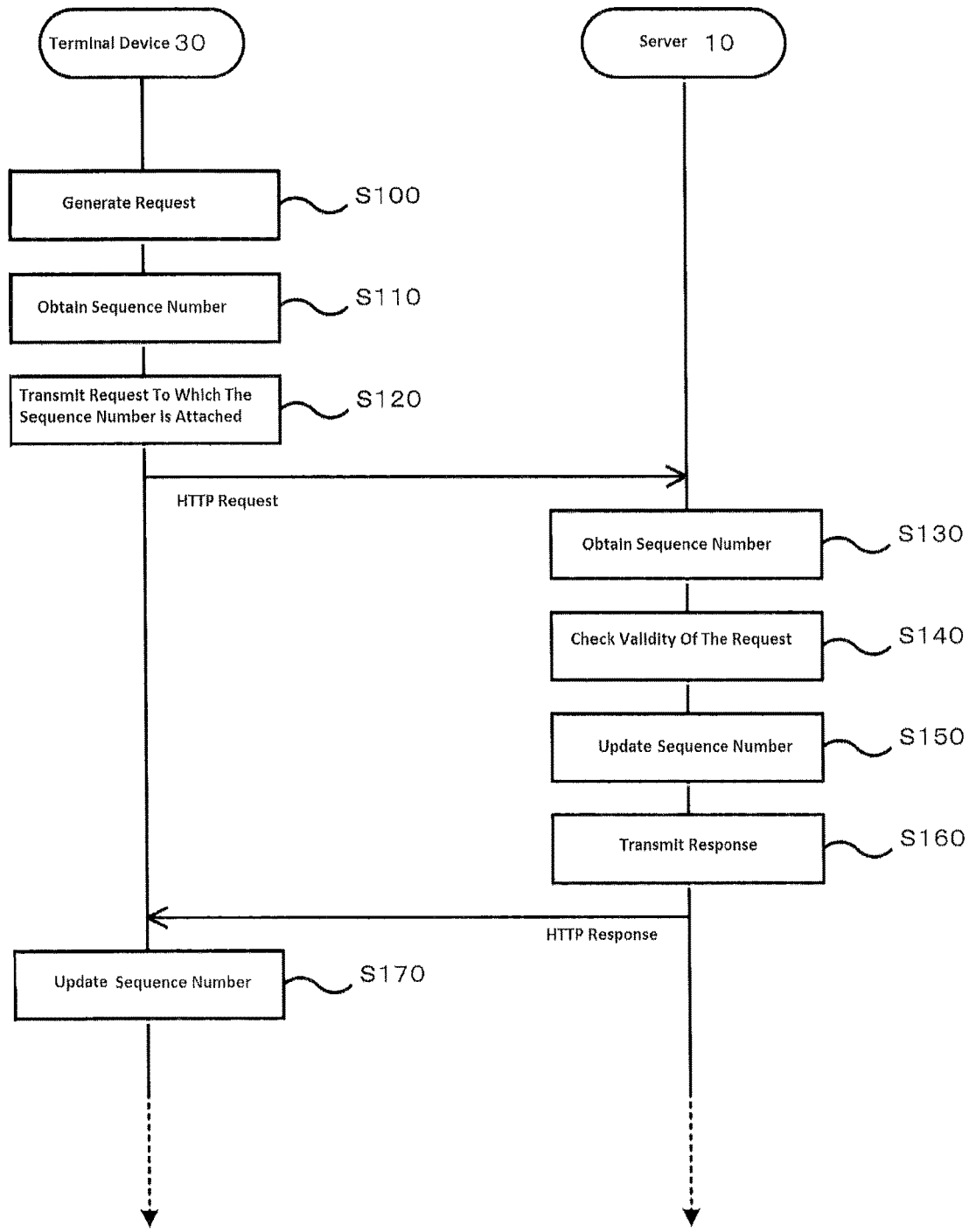
FIG. 4 is a sequence diagram showing an example of communication between a server 10 and a terminal device 30.

FIG. 4 is a sequence diagram showing communication between the server 10 and the terminal device 30 while the system 1 provides an online game to a login user. Referring to FIG. 4, communication between the terminal device 30 and the server 10 starts with generation of a HTTP request to be sent to the server 10 by the terminal device 30 (step S100). This step corresponds to the feature of the request transmit unit 53 of the terminal device 30. The HTTP request may include a request line (which is composed of, for example, method, request URI, and protocol version), a header, and a body.

The terminal device 30 subsequently may obtain a sequence number stored in the sequence number storage region 51b (step S110). This step corresponds to the feature of the request transmit unit 53 of the terminal device 30.

The terminal device 30 may then transmit, to the server 10, an HTTP request with which the obtained sequence number is attached (step S120). This step corresponds to the feature of the request transmit unit 53 of the terminal device 30.

The server 10 subsequently may obtain, in response to the HTTP request from the terminal device 30, the sequence number of the login user stored in the each-user sequence number management table 41a (step S130). This step corresponds to the feature of the validity check unit 43 of the server 10. Here, the sequence number of the login user is the sequence number corresponding the "user ID" used when the user of the terminal device 30 logs in to the server 10 through the game application 51a.

The server 10 may then check the validity of the HTTP request based on comparison between the obtained sequence number of the login user and the sequence number attached to the HTTP request from the terminal device 30 (step S140). This step corresponds to the feature of the validity check unit 43 of the server 10. More specifically, when the obtained sequence number of the login user corresponds to the sequence number attached to the HTTP request, the validity of the HTTP request is confirmed. Whereas when the obtained sequence number of the login user does not correspond (different) to the sequence number attached to the HTTP request, the HTTP request is considered as invalid (an unauthorized HTTP request).

As described above, the each-user sequence number management table 41a manages the previous sequence number as the sequence number of each user in addition to the current sequence number. The acquisition of the sequence number and the validity check of the HTTP request based on the comparison of the sequence numbers in the steps S130-S140 are performed based on the previous sequence number and the current sequence number. For example, when the HTTP request is considered as invalid based on the comparison between the current sequence of the login user and the sequence number attached to the HTTP request, the validity check of the HTTP request based on the comparison between the previous sequence number of the login user and the sequence number attached to the HTTP request may be performed.

In one embodiment, when the HTTP request is considered as invalid (more specifically, when the obtained sequence number does not correspond to the sequence number attached to the HTTP request), the server 10 may perform various processes. For example, when the HTTP request is considered as invalid, the server 10 may perform a process for disrupting the communication between the server 10 and the terminal device 30 or a process for transmitting an error message to the terminal device 30 (the game application 51a). Moreover, the fact that the HTTP request is considered as invalid may be recorded in the information storage unit 41 (the storage 15 or the like) together with the information that identifies the login user (for example, the user ID). In this case, while the invalidity of the HTTP request is recorded, the communication between the server 10 and the terminal device 30 and the provision of the online game may be continued.

Once the server 10 confirms the validity of the HTTP request, the server 10 may update the sequence number of the login user stored in the each-user sequence number management table 41a according to a predetermined update rule (step S150). This step corresponds to the feature of the sequence number update unit 44 of the server 10. In one embodiment, an update rule for updating the sequence number is "adding 1 (one)" to the number. Here, as described above, the each-user sequence number management table 41a manages the previous sequence number in addition to the present sequence number as described above, so that the "current sequence number" is set to the "previous sequence number" and the newly updated sequence number is set to the "current sequence number" in the step S150.

The server 10 may subsequently generate a HTTP response responding to the HTTP request and transmit the HTTP response to the terminal device 30 (step S160). This step corresponds to the feature of the response transmit unit 45 of the server 10. The HTTP response may include a status line (for example, the status line is composed of protocol version, status code, and text phrase), a header, and a body.

In response to the HTTP response from the server 10 to the HTTP request, the terminal device 30 may update the sequence number stored in the sequence number storage region 51b according to a predetermined update rule (step S170). This step corresponds to the feature of the sequence number update unit 54 of the terminal device 30. The sequence number may be updated according to the same rule as the update rule applied for the update of the sequence number performed by the server 10 in the step S150. For instance, the sequence number is updated according to a rule of "adding 1(one)" to the number.

In one embodiment, the above-described communication (the steps S100-S170) may be repeated between the server 10 and the terminal device 30 during the provision of the online game to the login user. More specific example of such communication will be now described with reference to FIG. 5. In the example shown in FIG. 5, a prescribed value "0" is set as an initial value of the sequence number. More specifically, the prescribed value "0" is set as the initial value for a sequence number seq_id managed in the sequence number storage region 51b of the terminal device 30, a current sequence number seq_id_n and a previous sequence number seq_id_o managed in the each-user sequence number management table 41a of the server 10.

Figure 5:
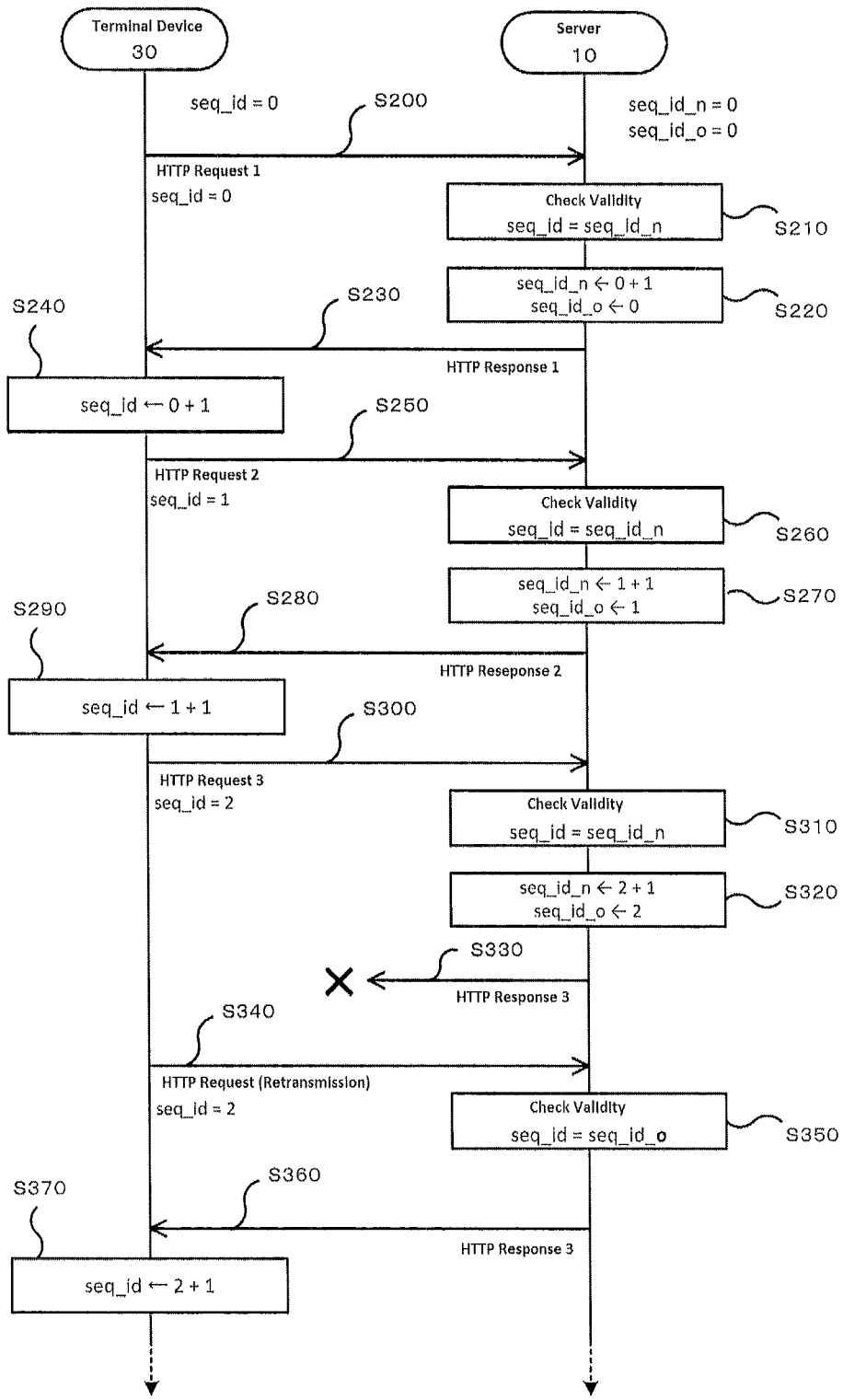
FIG. 5 is a sequence diagram showing a specific example of communication between the server 10 and the terminal device 30.

In the example shown in FIG. 5, the terminal device 30 may firstly transmit a HTTP request 1 to the server 10 (a step S200). The sequence number seq_id is attached to the HTTP request 1 and the sequence number seq_id is set to the value "0" obtained from the sequence number storage region 51b.

The server 10 may then check validity of the HTTP request 1 received from the terminal device 30 (step S210). Here, because the sequence number seq_id of the terminal device 30 corresponds to the sequence number (seq_id_n and seq_id_o) of the server 10 (both values are "0"), the validity of the HTTP request is confirmed.

Next, the current sequence number seq_id_n may be updated by the server 10 such that the updated sequence number becomes "1" by adding 1(one) to the current sequence number seq_id_n (value "0") (step S220), and an HTTP response 1 is transmitted from the server 10 to the terminal device 30 (step S230).

The sequence number seq_id may be then updated by the terminal device 30 that received the HTTP response 1 such that the updated sequence number seq_id becomes "1" by adding 1(one) to the sequence number seq_id (value "0") managed in the sequence number storage region 51b (a step S240), and a next HTTP request 2 is transmitted from the terminal device 30 to the server 10 (step S250). The sequence number seq_id attached to the HTTP request 2 is set to the value of "1" obtained from the sequence number storage region 51b.

The server 10 may then check validity of the HTTP request 2 received from the terminal device 30 (step S260). Here, because the sequence number seq_id of the terminal device 30 corresponds to the current sequence number seq_id_n of the server 10 (both values are "1"), the validity of the HTTP request 2 is confirmed.

Next, by the server 10, the previous sequence number seq_id_o may be updated such that the updated previous sequence number becomes the value of the current sequence number seq_id_n, and the current sequence number seq_id_n (its value is "1") may be updated such that a value of the updated current sequence number seq_id_n becomes "2" by adding "1" to the value of the number (step S270). An HTTP response 2 may be then transmitted from the server 10 to the terminal device 30 (step S280).

The sequence number seq_id may be then updated by the terminal device 30 that received the HTTP response 2, such that the updated sequence number seq_id becomes "2" by adding 1(one) to the sequence number seq_id (value "1") managed in the sequence number storage region 51b (step S290). In the same manner as the above-described steps S250-S280, a HTTP request 3 is transmitted from the terminal device 30 to the server 10, and an HTTP response 3 to the HTTP request 3 is transmitted from the server 10 to the terminal device 30 (steps S300-S330).

Here, if the HTTP response 3 transmitted from the server 10 to the terminal device 30 is not arrived at the terminal device 30 for some reason in the step S330, the terminal device 30 may retransmit the HTTP request 3 to the server 10 (step S340).

The server 10 may then check validity of the HTTP request 3 retransmitted from the terminal device 30 (a step S350). Here, the sequence number seq_id of the terminal device 30 does not correspond to the current sequence number seq_id_n of the server 10 but the value of the sequence number seq_id corresponds to the value of the previous sequence number seq_id_o (both of the values are "2") so that the validity of the HTTP request 3 is confirmed. In this manner, according to an embodiment, the server 10 manages the previous sequence number (seq_id_o) in addition to the current sequence number (seq_id_n) as the sequence number of each login user. Therefore it is possible to adequately check validity of HTTP requests even when retransmission of an HTTP request is required and the like.

Here, when the HTTP request is considered as invalid based on the comparison between the current sequence number of the login user and the sequence number attached to the HTTP request but the validity of the HTTP request is confirmed based on the comparison between the previous sequence number of the login user and the sequence number attached to the HTTP request as described in the step S350, the update of the sequence number by the server 10 may be skipped and an HTTP response 3 responding to the HTTP request 3 may be transmitted (step S360). The sequence number seq_id may be then updated by the terminal device 30 such that the updated sequence number seq_id becomes "3" by adding 1(one) to the sequence number seq_id (value "2") managed in the sequence number storage region 51b (step S370).

Figure 6:
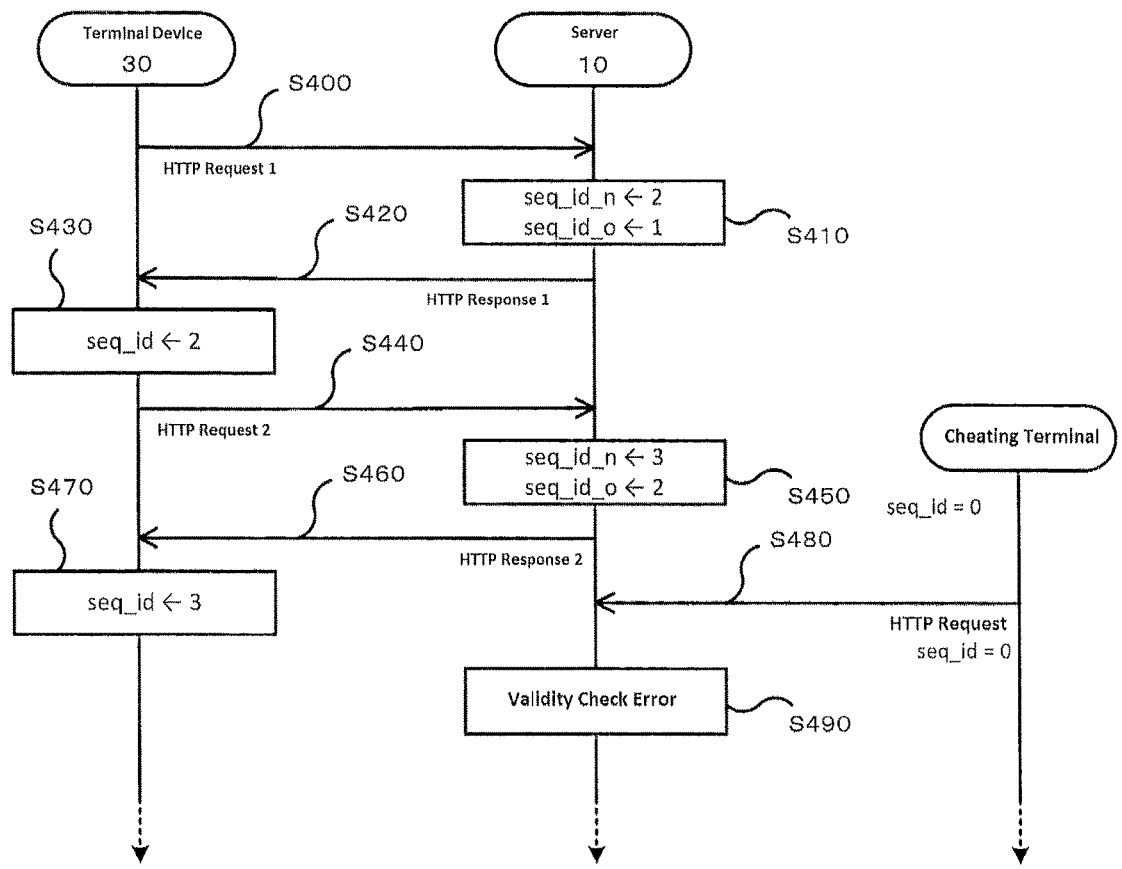
FIG. 6 is a sequence diagram showing a specific example of communication between the server 10 and the terminal device 30.

Referring to FIG. 6, actions at the time when a user of the terminal device 30 logs in to the server 10 through a cheating client which is a modification of the game application 51a using the same user ID as one used for login to the server 10 through the game application 51a, and the user tries to communicate with the server 10 will be now described. In the example shown in FIG. 6, with the communication between the terminal device 30 and the server 10 through the legitimate (unmodified) game application 51a, the transmission and reception of the HTTP request 1 and the HTTP response 1 and the transmission and reception of the HTTP request 2 and the HTTP response 2 are performed. Consequently, the sequence number seq_id of the terminal device 30 is set to "3," the current sequence number seq_id_n of the server 10 is set to "3," and the previous sequence number seq_id_o is set to "2" (steps S400-S470). When a HTTP request is transmitted to the server 10 in this state from the terminal device executing a cheating client (a cheating terminal) (a step S480), the sequence number seq_id attached to the HTTP request (its value is, for example, the initial value "0") is different from the sequence numbers (their values are "3" and "2") of the server 10 so that the sequence number attached to the HTTP request does not correspond to the sequence number of the login user obtained by the server 10. Accordingly, the HTTP request transmitted from the cheating terminal to the server 10 would not be confirmed as valid and the request is considered as an illegitimate HTTP request (a step S490). In this way, the system 1 according to the embodiment can inhibit the communication with the server 10 through the cheating client while the user communicates with the server 10 through the legitimate game application 51a using the same user ID (with the same login user).

Moreover, the above-mentioned cheating client may be executed on the terminal device 30 on which the legitimate game application 51a is running. Even in this case, the sequence number storage region 51b is configured as a dedicated region for the game application 51a and the cheating client cannot obtain the sequence number from the sequence number storage region 51b. Therefore the HTTP request transmitted to the server 10 through the cheating client will not be considered as valid and determined as an illegitimate HTTP request in the same manner as the example of FIG. 6.

The sequence number storage region 51b may be configured as an non-volatile region and the (updated) sequence number stored therein is retained even after reboot of the terminal device 30 and the like. Therefore, even right after the reboot of the terminal device 30, for example, the HTTP request transmitted to the server 10 through the cheating client is considered as invalid and determined as an illegitimate HTTP request in the same manner as the example of FIG. 6.

The system 1 according to the embodiment described above realizes the provision of an online game (a predetermined service) to a login user who is logged in to the server 10 through the game application 51*a* (a predetermined program) by the HTTP communication between the server 10 and the terminal device 30. The HTTP communication may include a step where the terminal device 30 transmits, to the server, an HTTP request attached with the sequence number stored in the sequence number storage region 51*b* dedicated to the game application 51*a*. The HTTP communication may further include a step where the server 10 checks validity of the HTTP request based on comparison between the sequence number attached to the HTTP request from the terminal device 30 and the sequence number of the login user stored in the each-user sequence number management table 41*a*. The HTTP communication may further include a step where the server 10 updates the sequence number of the login user stored in the each-user sequence number management table 41*a* according to a predetermined update rule, a step where the server 10 transmits an HTTP response responding to the HTTP request to the terminal device 30, and a step where the terminal device 30, in response to the HTTP response from the server 10 responding to the HTTP request, updates the sequence number stored in the sequence number storage region 51*b* according to the above-described predetermined update rule. As described above, the system 1 according to one embodiment checks the validity of the HTTP request based on the comparison between the sequence number of each user. The sequence number is stored in the dedicated region of the game application 51*a*. Therefore it is possible to prevent any program (for example, the cheating client) other than the game application 51*a* from obtaining the updated sequence number and also prevent the user from performing communication with the server 10 through the program other than the game application 51*a* using the same user ID (with the same login user). According to the above-described embodiments of the disclosure, it is possible to inhibit improper communication using modified software without checking the game data itself.

The update rule for the sequence number in the above-described embodiments was "adding 1(one)" to the number. However, other rules can be also applied. For example, the rules may be "subtracting 1" from the number, "adding or subtracting other predetermined number", and other operations. Moreover, the sequence number is illustrated as the confirmation information to check validity of an HTTP request in the above-described embodiment. However, in various embodiment of the disclosure, the confirmation information may be various types of information including, for example, information including a character string other than numbers. Furthermore, various update rules for the confirmation information other than arithmetic expressions can also be applied.

Although the communication between the server 10 and the terminal device 30 is realized with HTTP communication in accordance with HTTP in the above-described embodiment, the embodiments of the disclosure can be applied to communication complied with various request-response-type protocols other than the HTTP.

Moreover, although the case where a specific online game is provided through the game application 51*a* is described in the above-described embodiment, the embodiments of the disclosure can also be applied to various services other than online games.

The processes and procedures described and illustrated herein may also be implemented by software, hardware, or any combination thereof other than those explicitly stated for the embodiments. More specifically, the processes and procedures described and illustrated herein may be implemented by the installation of the logic corresponding to the processes into a medium such as an integrated circuit, a volatile memory, a non-volatile memory, a magnetic disk, or an optical storage. The processes and procedures described and illustrated herein may also be installed in the form of a computer program, and executed by various computers.

Even if the processes and the procedures described herein are executed by a single apparatus, software piece, component, or module, such processes and procedures may also be executed by a plurality of apparatuses, software pieces, components, and/or modules. Even if the data, tables, or databases described herein are stored in a single memory, such data, tables, or databases may also be dispersed and stored in a plurality of memories included in a single apparatus or in a plurality of memories dispersed and arranged in a plurality of apparatuses. The elements of the software and the hardware described herein can be integrated into fewer constituent elements or can be decomposed into more constituent elements.

With respect to the use of substantially any plural and/or singular terms herein, those having skill in the art can translate from the plural to the singular and/or from the singular to the plural as is appropriate to the context.

What is claimed is:

1. A system for providing a predetermined service to a user through a predetermined program executed on a client terminal, comprising:
   a server having at least one processor; and
   a client terminal communicatively coupled to the server via a network,
   wherein upon detecting of a user logging in to the server from the client terminal, the system realizes provision of the predetermined service to the user through the predetermined program with predetermined communication between the server and the client terminal, and
   wherein the client terminal includes a terminal-side storage storing confirmation information in a dedicated region of the predetermined program, the dedicated region of the predetermined program in the terminal-side storage being a region where access by programs other than the predetermined program is restricted, and
   wherein the server includes a server-side storage storing the confirmation information of each user, and
   wherein the predetermined communication includes:
      receiving, by the server, a request to which the confirmation information stored in the terminal-side storage is attached from the client terminal;
      checking, by the server, validity of the request based on comparison between the confirmation information attached to the request from the client terminal and a first confirmation information of the login user stored in the server-side storage;
      in response to the confirmation information matching the first confirmation information, transmitting, by the server, a response to the request to the client terminal that causes the client terminal to update the confirmation information stored in the terminal-side storage according to the predetermined update rule responding to the response from the server;

set a second confirmation information to the first confirmation information, and updating, by the server, the first confirmation information of the user according to a predetermined update rule stored in the server-side storage;

in response to the confirmation information not matching the first confirmation information, comparing, by the server, the confirmation information with the second confirmation information; and in response to the confirmation information matching the second confirmation information, transmitting, by the server, a previous response to the request to the client terminal that causes the client terminal to update the confirmation information stored in the terminal-side storage according to the predetermined update rule responding to the response from the server.

2. The system of claim 1 wherein the server-side storage stores, as the confirmation information of each user, first confirmation information which is current confirmation information, and second confirmation information which is previous confirmation information before updated to the current confirmation information, and the checking validity includes checking validity of the request based on comparison between the confirmation information attached to the request and the first confirmation information and comparison between the confirmation information attached to the request and the second confirmation information.

3. The system of claim 1 wherein the confirmation information is a numerical value, and the predetermined update rule is adding or subtracting a predetermined number.

4. The system of claim 1 wherein the predetermined communication is communication in accordance with HTTP, the request is a HTTP request, and the response is a HTTP response.

5. The system of claim 1, wherein the dedicated region of the predetermined program in the terminal-side storage is a non-volatile region.

6. The system of claim 1, wherein the predetermined service is an online game.

7. The system of claim 1, wherein the request is valid if the confirmation information attached to the request from the client terminal and the confirmation information of the login user stored in the server-side storage are the same.

8. A method implemented on a system for providing a predetermined service to a user through a predetermined program executed on a client terminal communicatively coupled to a server having at least one processor, the method comprising:

upon detecting of a user logging in to the server from the client terminal, realizing provision of the predetermined service to the user through the predetermined program with a predetermined communication between the server and the client terminal, the client terminal includes a terminal-side storage storing confirmation information in a dedicated region of the predetermined program, the dedicated region of the predetermined program in the terminal-side storage being a region where access by programs other than the predetermined program is restricted, the server includes a server-side storage storing the confirmation information of each user, wherein the predetermined communication includes:

receiving by the server, a request to which the confirmation information stored in the terminal-side storage is attached from the client terminal;

checking validity of the request based on comparison between the confirmation information attached to the request from the client terminal and a first confirmation information of the login user stored in the server-side storage;

in response to the confirmation information matching the first confirmation information, transmitting, by the server, a response to the request to the client terminal that causes the client terminal to update the confirmation information stored in the terminal-side storage according to the predetermined update rule responding to the response from the server;

set a second confirmation information to the first confirmation information, and updating, by the server, the first confirmation information of the user according to a predetermined update rule stored in the server-side storage;

in response to the confirmation information not matching the first confirmation information, comparing, by the server, the confirmation information with the second confirmation information; and in response to the confirmation information matching the second confirmation information, transmitting, by the server, a previous response to the request to the client terminal that causes the client terminal to update the confirmation information stored in the terminal-side storage according to the predetermined update rule responding to the response from the server.

* * * * *